United States Patent
Takeda

Patent Number: 5,264,791
Date of Patent: Nov. 23, 1993

[54] BICYCLE COMPUTER SPEED SENSOR AND HOUSING ASSEMBLY HAVING IMPROVED HOUSING SEAL

[75] Inventor: Goro Takeda, Souraku, Japan

[73] Assignee: Cat Eye Co., Ltd., Osaka, Japan

[21] Appl. No.: 837,170

[22] Filed: Feb. 18, 1992

[30] Foreign Application Priority Data

Feb. 18, 1991 [JP] Japan ............... 3-006679[U]

[51] Int. Cl.⁵ ............................................. G01P 3/484
[52] U.S. Cl. ................................. 324/174; 324/207.13
[58] Field of Search ............... 324/160, 166, 173, 174, 324/178, 179, 207.14, 207.25; 73/862.19, 862.36; 340/134, 756, 793, 670; 335/205, 206, 207; 200/52 R, 61.41, 61.42

[56] References Cited

U.S. PATENT DOCUMENTS

| | | | |
|---|---|---|---|
| 4,434,801 | 3/1984 | Jiminez et al. | 324/166 X |
| 4,633,216 | 12/1986 | Tsuyama | 324/174 X |
| 4,636,769 | 1/1987 | Tsuyama | 324/174 X |
| 4,642,606 | 2/1987 | Tsuyama | 324/174 X |
| 4,780,864 | 10/1988 | Houlihan | 324/160 X |
| 4,820,979 | 4/1989 | Schwerdhöfer et al. | 324/174 X |
| 4,887,249 | 12/1989 | Thinesen | 324/160 X |
| 4,966,380 | 10/1990 | Mercat | 73/862.19 X |
| 5,008,647 | 4/1991 | Brunt et al. | 324/178 X |
| 5,027,303 | 6/1991 | Witte | 73/862.36 X |

*Primary Examiner*—Gerard R. Strecker
*Assistant Examiner*—Warren S. Edmonds
*Attorney, Agent, or Firm*—Allegretti & Witcoff, Ltd.

[57] ABSTRACT

A sensor assembly for a two-wheeled vehicle having a sensor housing for holding a sensor receiver having a rod body supporting a reed switch. An O-ring is provided on the exterior wall of the rod body for sealing the inside of the sensor housing from the outside when the rod body is inserted into the sensor housing. The sensor housing is attached to a sensor support that is fixed to a part of the bicycle frame, for example, the fork that supports the front wheel. The reed switch will sense the rotation of the front wheel.

5 Claims, 4 Drawing Sheets

BICYCLE COMPUTER SPEED SENSOR AND HOUSING ASSEMBLY HAVING IMPROVED HOUSING SEAL

BACKGROUND OF THE INVENTION

1. Field of the Invention

The present invention relates to parts for two-wheeled vehicles and, more particularly, to a sensor unit for storing therein a sensor for detecting revolving speed of wheels of bicycles or the like.

2. Description of the Background Art

Recently, speedometers are sometimes attached to bicycles in order to readily know travel speed, travel distance and the like of the bicycles.

FIG. 5 is a side view of a conventional bicycle to which a speedometer is attached; and FIG. 6 is an enlarged view of a portion denoted with a symbol "X" of FIG. 5.

Referring to FIGS. 5 and 6, a speedometer 30 is mounted on a stem 31 of a handle of a bicycle 24. A magnet 26 is attached to a spoke 32 of a front wheel of the bicycle. A sensor 28 for generating one pulse signal each time magnet 26 passes in front of sensor 28 is mounted on a portion of a fork 34 corresponding to magnet 26.

The signal generated by sensor 28 is input through a cord 11 to speedometer 30. Then, various types of operations are carried out in response to the input signal in speedometer 30. Information as to the calculated speed, travel distance and the like is supplied to a user.

FIG. 7 is an enlarged view of sensor 28 of FIG. 6; FIG. 8 is a side view of sensor 28 taken along the line VIII—VIII of FIG. 7; and FIG. 9 is a section view of sensor 28 taken along the line IX—IX of FIG. 7.

A description will now be made on the structure of a conventional sensor unit with reference to those figures.

Sensor unit 28 comprises a sensor storage 39 for storing therein a reed switch 29 constituting the sensor, a sensor cover 35 for covering sensor storage 39, a band 5 for fixing sensor 28 onto fork 34, and a screw 7 for mounting sensor cover 35 pivotally on band 5.

In sensor cover 39, reed switch 29 is soldered onto a base plate 25, and core wires of a cord 27 externally connected in sensor cover 39 are each soldered onto base plate 25. Sensor storage 35 and sensor cover 39 are combined together in concave and convex forms as shown in the figure. In order to protect reed switch 29 or the like against rainwater or the like introduced from the outside, reed switch 29, base plate 25, cord 27, the core wires thereof and the like are resin-sealed by polyurethane 41. In such a manner, the inside of the sensor is protected against water drops or the like introduced between sensor storage 35 and sensor cover 39.

In the above-described conventional sensor unit, since it is necessary to seal the sensor with such resin as polyurethane or the like, it takes time to manufacture the sensor unit. Further, once the sensor is sealed with resin, any defects of reed switch 29, base plate 25 and the like cannot easily be inspected or repaired, resulting in a decrease in yield.

SUMMARY OF THE INVENTION

One object of the present invention is to provide a parts unit for easily and securely protecting parts for a two-wheeled vehicle from the outside.

Another object of the present invention is to provide a parts unit capable of facilitating inspection and repair of parts for a two-wheeled vehicle.

In order to accomplish the foregoing objects, a parts unit in accordance with the present invention includes: holding means having a rod-shape for holding a reed switch constituting a sensor at its tip end; storage means having a cylindrical shape with its one end closed and the other end opened for allowing the holding means along with the reed switch to be freely inserted from the other end; and sealing means for sealing the inside of the storage means from the outside, with the holding means inserted into the storage means.

In the parts unit thus structured, since the holding means inserted into the storage means is sealed from the outside, parts for a two-wheeled vehicle are securely protected from the outside and can easily be inspected and repaired.

The foregoing and other objects, features, aspects and advantages of the present invention will become more apparent from the following detailed description of the present invention when taken in conjunction with the accompanying drawings.

BRIEF DESCRIPTION OF THE DRAWINGS

There is shown in the attached drawing a presently preferred embodiment of the present invention, wherein like numerals in the various views refer to like elements, and where.

DESCRIPTION OF THE PREFERRED EMBODIMENTS

Figure 1:
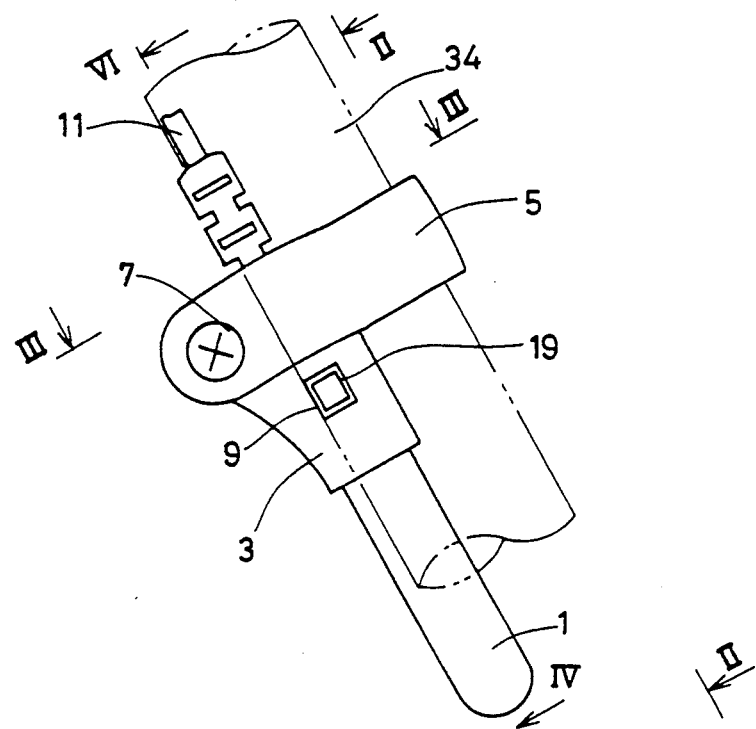
FIG. 1 is a side view showing the structure of a sensor unit according to one embodiment of the present invention.
Figure 2:
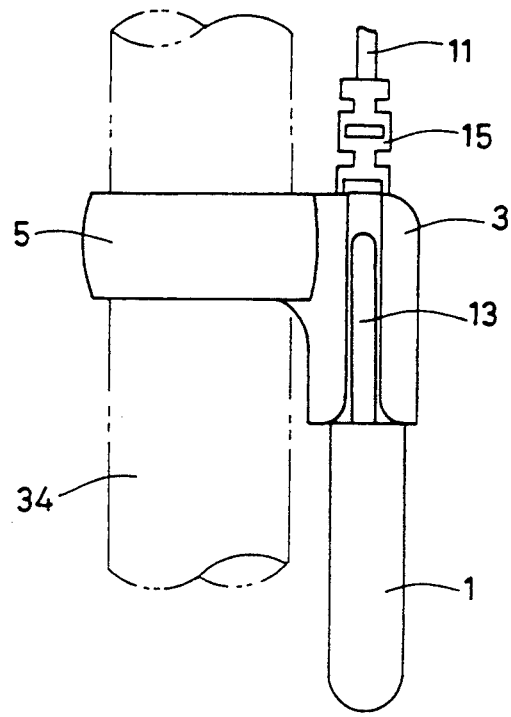
FIG. 2 is an overview of the sensor unit viewed from the line II—II FIG. 1.
Figure 3:
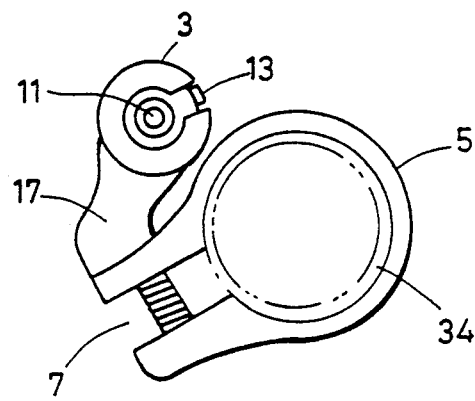
FIG. 3 is an overview of the sensor unit viewed from the line III—III of FIG. 1.

FIG. 1 is a side view showing the structure of a sensor according to one embodiment of the present invention; FIG. 2 is a view viewed from the line II—II of FIG. 1; and FIG. 3 is a view viewed from the line III-—III of FIG. 1.

The structure of a sensor unit will now be described with reference to FIGS. 1, 2 and 3.

The sensor unit comprises: a cylindrical sensor housing 1 having its tip end closed for storing a sensor such as a reed switch or the like therein; a sensor support 3 having a portion of an open circular cross-section for accepting sensor housing 1 inserted, with a protrusion 13 provided on sensor housing 1 used as a reference; a band 5 having a portion of an open circular sectional form for fixing the sensor unit onto a fork 34; a screw 7 for pivotally connecting an open end of band 5 and sensor support 3 with each other; an opening 9 engaged with a protrusion 19 provided on sensor housing 1 for preventing the falling off of sensor housing 1, with sensor housing 1 inserted into sensor support 3; and a cord support 15 for connecting sensor housing 1 and a cord 11. Sensor support 3 has a neck 17 as shown in the figure. Relationship between neck 17 and band 5 is made pivotal by forming, e.g., a chrysanthemum-shaped unevennesses on both an end of neck 17 and that of band 5. Fastening screw 7 causes engagement of the unevennesses and enables its pivotal position to be fixed.

Figure 4:
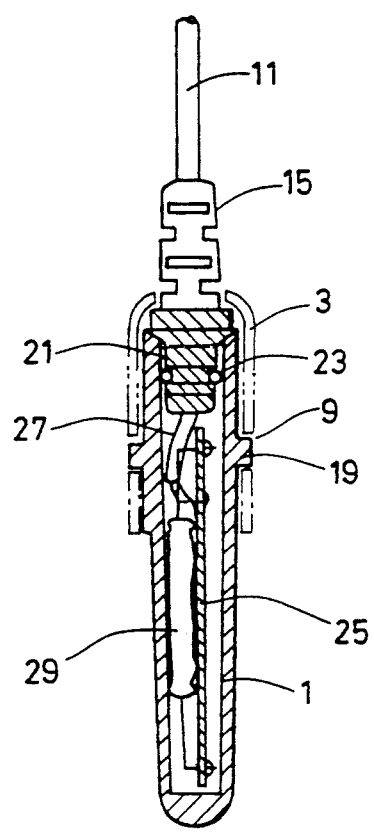
FIG. 4 is a section view taken along the line IV—IV of FIG. 1 and showing an internal structure of the sensor unit.
Figure 5:
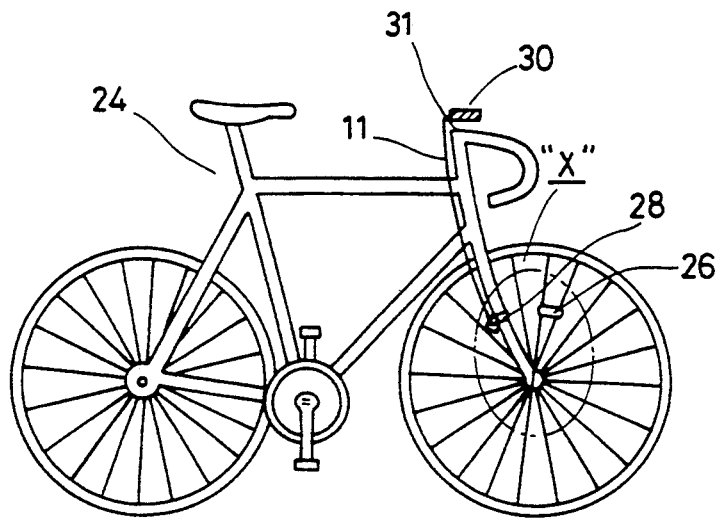
FIG. 5 is a side view of a common bicycle provided with a speedometer and a sensor.
Figure 6:
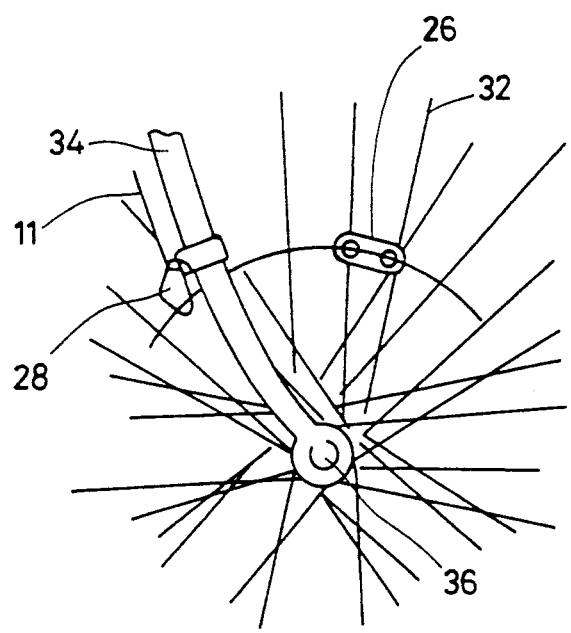
FIG. 6 is an enlarged view of a portion "X" of FIG. 5.
Figure 7:
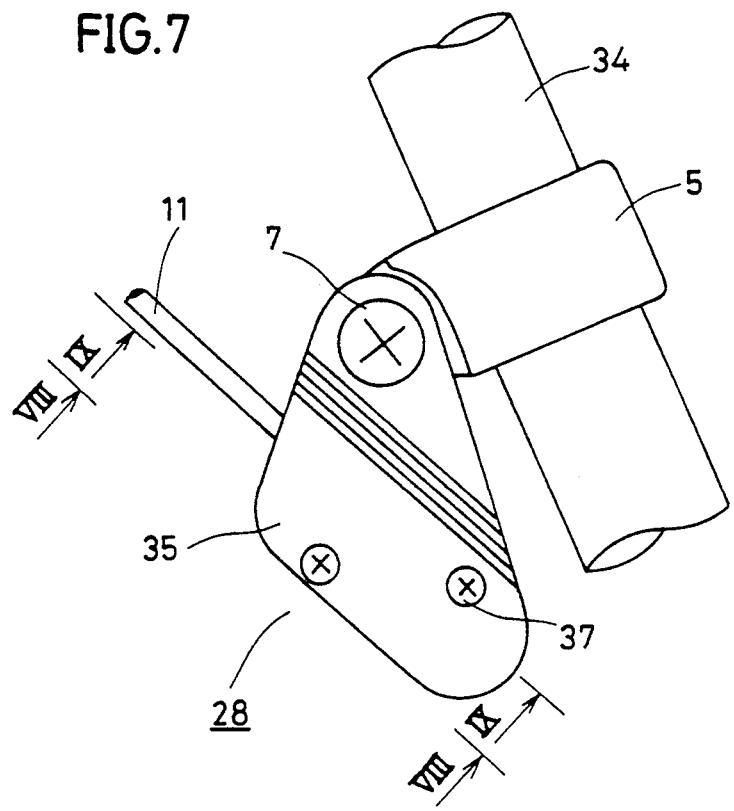
FIG. 7 is an enlarged view of the sensor unit of FIG. 6 and showing the structure of a conventional sensor unit.
Figure 8:
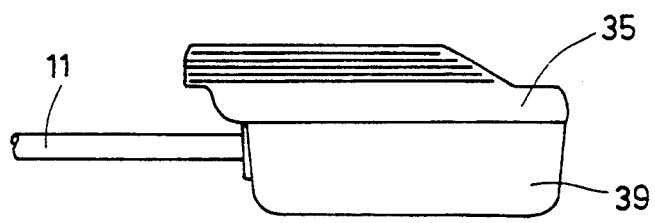
FIG. 8 is a view showing the structure of the sensor unit viewed from the line VIII—VIII of FIG. 7.
Figure 9:
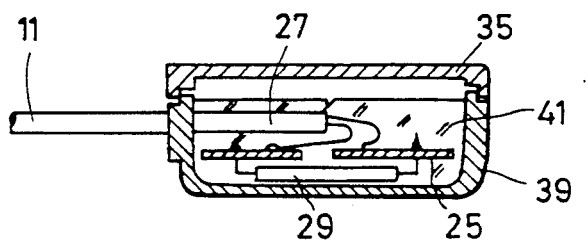
FIG. 9 is a section view taken along the line IX—IX of FIG. 7.

FIG. 4 is a sectional view taken along the line IV—IV of FIG. 1 and showing in detail an internal structure of the sensor.

Referring to FIG. 4, the sensor unit is attached to a rod-like sensor receiver 21 connected with cord support 15 supporting cord 11. The core wire of a cord 27 that runs through sensor receiver 21 and is taken out to its tip end is connected by soldering to a base plate 25. A reed switch 29 for generating one pulse signal each time a magnet passes in front of reed switch 29 is soldered onto base plate 25. Sensor receiver 21 is allowed to be freely inserted into cylindrical sensor housing 1 with its tip end closed. An O ring 23 is formed on a sidewall of sensor receiver 21. O ring 23 seals from the outside reed switch 29 or the like in sensor housing 1 having sensor receiver 21 inserted therein. Two protrusions 19 having such cross-section as shown in the figure are formed at opposing positions on sidewalls of sensor housing 1. Protrusions 19 are engaged with openings 9 formed on sidewalls of sensor support 3. When the sensor unit is taken out of sensor support 3, since a portion of sensor support 3 corresponding to protrusion 13 formed in sensor housing 1 is an open end, broadening the corresponding open portion makes it possible to release the engagement between protrusions 19 and openings 9 and to detach the sensor unit from the sensor support.

While the sensor unit of the present invention is applied to the sensor unit of a speedometer in the foregoing embodiment, the present sensor unit is also applicable to other bicycle parts, the inside of which is necessary to be sealed from the outside.

While a single O ring is employed in the foregoing embodiment, two or more O rings may be employed to further enhance sealing effects.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sensor assembly for use in a two-wheeled vehicle, comprising:
    a sensor receiver having a rod-like shape for holding a reed switch constituting a sensor on a tip end of said sensor receiver;
    a sensor housing having a generally cylindrical shape with one end closed and the other end opened for allowing said sensor receiver to be freely inserted therein along with said reed switch from said other end; and
    sealing means for sealing the inside of said sensor housing from the outside when said sensor receiver is inserted into said sensor housing.

2. A sensor assembly according to claim 1, wherein said sealing means comprises an O-ring on said sensor receiver.

3. A sensor assembly according to claim 1, wherein said sensor assembly for use in a two-wheeled vehicle is mounted adjacent a wheel of the two-wheeled vehicle for detecting the revolving speed of the said wheel.

4. A sensor unit for detecting the revolving speed of a wheel of a two-wheeled vehicle, comprising:
    a rod body having a reed switch constituting a sensor, provided on a tip end of said rod body;
    a cord connected at one end through said rod body to said reed switch;
    a sensor housing having a cylindrical shape with a tip end thereof closed for allowing said rod body to be freely inserted therein and surrounding said reed switch when said rod body is inserted therein; and
    an O-ring attached to a side wall of said rod body for sealing the inside of said sensor housing from the outside when said rod body is inserted into said sensor housing.

5. The sensor unit according to claim 4, further comprising:
    a sensor support having a cylindrical cross-section and attached to said two wheeled vehicle,
    said sensor housing being engaged with and freely inserted into said sensor support.

* * * * *